United States Patent
Okubo (10) Patent No.: US 8,934,803 B2
(45) Date of Patent: Jan. 13, 2015

(54) IMAGE FORMING APPARATUS, BIAS POWER SUPPLY DEVICE, AND BIAS POWER SUPPLY METHOD TO CONTROL START AND STOP OF SUPPLY OF TRANSFER ELECTRIC FIELD TO TRANSFER ROLLER

(71) Applicant: Fuji Xerox Co., Ltd., Tokyo (JP)

(72) Inventor: Wataru Okubo, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 34 days.

(21) Appl. No.: 13/758,285

(22) Filed: Feb. 4, 2013

(65) Prior Publication Data

US 2014/0010564 A1 Jan. 9, 2014

(30) Foreign Application Priority Data

Jul. 9, 2012 (JP) ................ 2012-154121

(51) Int. Cl.
*G03G 15/00* (2006.01)
*G03G 15/16* (2006.01)
*H02M 3/335* (2006.01)
*G03G 15/01* (2006.01)
*H02M 1/00* (2006.01)

(52) U.S. Cl.
CPC ........... *G03G 15/80* (2013.01); *H02M 3/33515* (2013.01); *H02M 3/33569* (2013.01); *G03G 15/0131* (2013.01); *G03G 15/5004* (2013.01); *H02M 2001/0077* (2013.01); *G03G 15/1675* (2013.01)
USPC ............................................. 399/88; 399/66

(58) Field of Classification Search
USPC .................................... 399/66, 88
See application file for complete search history.

(56) References Cited

U.S. PATENT DOCUMENTS

| 5,684,685 | A | * | 11/1997 | Komatsu et al. | 363/95 |
| 5,692,232 | A | * | 11/1997 | Okano et al. | 399/53 |
| 5,777,863 | A | * | 7/1998 | Kowalevskii et al. | 363/63 |
| 5,903,183 | A | * | 5/1999 | Inukai | 327/540 |
| 6,173,135 | B1 | * | 1/2001 | Yuminamochi et al. | 399/66 |
| 6,963,701 | B2 | * | 11/2005 | Inukai | 399/66 |
| 7,376,366 | B2 | * | 5/2008 | Deguchi | 399/66 |
| 2010/0329714 | A1 | * | 12/2010 | Tsukamura et al. | 399/66 |
| 2012/0027448 | A1 | * | 2/2012 | Mukaibara | 399/88 |
| 2014/0016956 | A1 | * | 1/2014 | Terasaki | 399/66 |

FOREIGN PATENT DOCUMENTS

| JP | 3721825 B2 | 11/2005 |
| JP | 2010-161836 A | 7/2010 |

* cited by examiner

*Primary Examiner* — G. M. Hyder
(74) *Attorney, Agent, or Firm* — Sughrue Mion, PLLC (57) ABSTRACT

An image forming apparatus includes an image carrier, a charging unit, an exposure unit, a developing unit, and a transfer unit. The transfer unit includes a transfer bias power supply and transfers a developed image onto a transfer body. The transfer bias power supply includes a first power supply unit that generates a non-transfer electric field, a second power supply unit that generates a transfer electric field, a first switching controller, and a second switching controller. The first switching controller controls start of supply of the transfer electric field in accordance with a first time constant when switching from the non-transfer electric field to the transfer electric field is performed. The second switching controller controls stop of supply of the transfer electric field in accordance with a second time constant when switching from the transfer electric field to the non-transfer electric field is performed.

11 Claims, 6 Drawing Sheets

IMAGE FORMING APPARATUS, BIAS POWER SUPPLY DEVICE, AND BIAS POWER SUPPLY METHOD TO CONTROL START AND STOP OF SUPPLY OF TRANSFER ELECTRIC FIELD TO TRANSFER ROLLER

CROSS-REFERENCE TO RELATED APPLICATIONS

This application is based on and claims priority under 35 USC 119 from Japanese Patent Application No. 2012-154121 filed Jul. 9, 2012.

BACKGROUND

Technical Field

The present invention relates to an image forming apparatus, a bias power supply device, and a bias power supply method.

SUMMARY

According to an aspect of the invention, there is provided an image forming apparatus including an image carrier, a charging unit, an exposure unit, a developing unit, and a transfer unit. The charging unit charges the image carrier. The exposure unit exposes the image carrier to light and forms an electrostatic latent image on the image carrier. The developing unit develops the electrostatic latent image formed on the image carrier exposed by the exposure unit, so as to form a developed image. The transfer unit includes a transfer bias power supply and transfers the developed image onto a transfer body. The transfer bias power supply includes a first power supply unit, a second power supply unit, a first switching controller, and a second switching controller. The first power supply unit generates a non-transfer electric field for not transferring the developed image onto the transfer body. The second power supply unit generates a transfer electric field for transferring the developed image onto the transfer body. The transfer electric field has a polarity different from a polarity of the non-transfer electric field. The first switching controller has a predetermined first time constant, and controls start of supply of the transfer electric field from the second power supply unit in accordance with the first time constant when switching from the non-transfer electric field to the transfer electric field is performed. The second switching controller has a second time constant which is smaller than the first time constant, and controls stop of supply of the transfer electric field from the second power supply unit in accordance with the second time constant when switching from the transfer electric field to the non-transfer electric field is performed.

BRIEF DESCRIPTION OF THE DRAWINGS

An exemplary embodiment of the present invention will be described in detail based on the following figures, wherein.

DETAILED DESCRIPTION

Image Forming Apparatus 1

Figure 1:
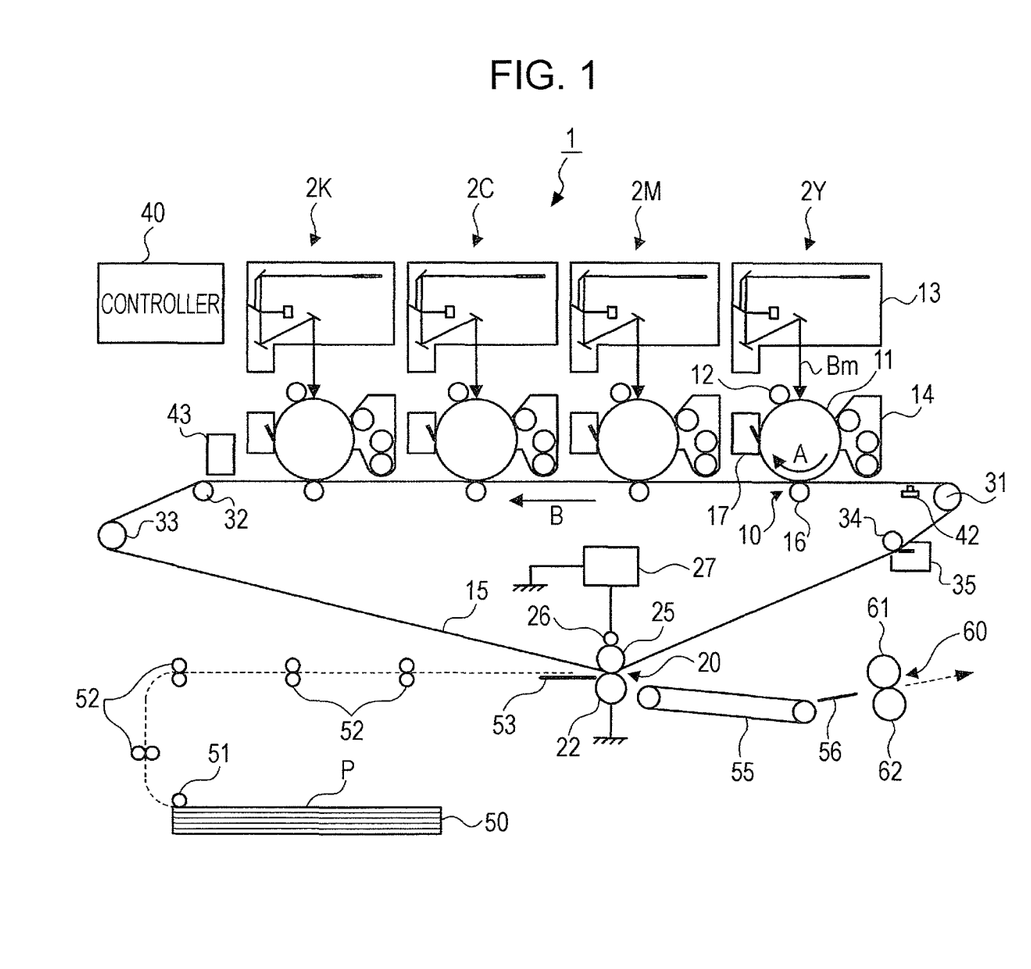
FIG. 1 is a schematic configuration diagram illustrating an example of an image forming apparatus according to an exemplary embodiment.

FIG. 1 is a schematic configuration diagram illustrating an example of an image forming apparatus 1 according to an exemplary embodiment. The image forming apparatus 1 illustrated in FIG. 1 is a tandem-type image forming apparatus which employs an intermediate transfer system, and includes plural image forming units 2Y, 2M, 2C, and 2K; first transfer sections 10; a second transfer section 20; and a fixing section 60. The image forming units 2Y, 2M, 2C, and 2K form toner images of respective color components by using an electrophotographic system. The first transfer sections 10 correspond to an example of transfer sections that sequentially transfer (first-transfer) the toner images of individual colors (color components) formed by the image forming units 2Y, 2M, 2C, and 2K onto an intermediate transfer belt 15, which is an example of a transfer body. The second transfer section 20 is an example of a transfer section that simultaneously transfers (second-transfers) the toner images (superposed toner images of individual colors) which have been transferred onto the intermediate transfer belt 15 onto a sheet P, which is another example of the transfer body. The fixing section 60 fixes the second-transferred images onto the sheet P. Also, the image forming apparatus 1 includes a controller 40 that controls the operations of individual devices (sections).

In the present exemplary embodiment, each of the image forming units 2Y, 2M, 2C, and 2K includes electrophotographic devices including a charging device 12, a laser exposure device 13, a developing device 14, a first transfer roller 16, and a drum cleaner 17, which are arranged around a photoconductor drum 11. The photoconductor drum 11 is an example of an image carrier that rotates in the direction indicated by an arrow A. The charging device 12 is an example of a charging unit that charges the photoconductor drum 11. The laser exposure device 13 is an example of an exposure unit that forms an electrostatic latent image on the photoconductor drum 11 (a light beam for exposure is denoted by a symbol Bm in FIG. 1). The developing device 14 is an example of a developing unit that contains toner of a corresponding color (component) and makes the electrostatic latent image on the photoconductor drum 11 visible by using the toner. The first transfer roller 16 transfers the toner image of the corresponding color formed on the photoconductor drum 11 onto the intermediate transfer belt 15 in the first transfer section 10. The drum cleaner 17 removes residual toner from the photoconductor drum 11. The image forming units 2Y, 2M, 2C, and 2K are arranged in the order of yellow (Y), magenta (M), cyan (C), and black (K) from the upstream side of the intermediate transfer belt 15.

The intermediate transfer belt 15, serving as an intermediate transfer body, is a film-like endless belt made of a resin, such as a polyimide resin or a polyamide resin, containing an appropriate amount of an antistatic agent such as carbon black. The volume resistivity of the intermediate transfer belt 15 is $10^6$ to $10^{14}$ $\Omega$cm, and the thickness thereof is, for example, about 0.1 mm. The intermediate transfer belt 15 is rotated by various rollers in the direction indicated by an arrow B of FIG. 1 at a predetermined speed. The various rollers include a driving roller 31, a support roller 32, a tension roller 33, a backup roller 25, and a cleaning backup roller 34. The driving roller 31 is driven by a motor (not illustrated) having a constant speed characteristic and rotates the intermediate transfer belt 15. The support roller 32 supports the intermediate transfer belt 15, which extends linearly along the direction in which the photoconductor drums 11 are arranged. The tension roller 33 applies a certain tension to the intermediate transfer belt 15 and functions as a correction roller for preventing meander of the intermediate transfer belt 15. The backup roller 25 is provided in the second transfer section 20. The cleaning backup roller 34 removes residual toner from the intermediate transfer belt 15.

The first transfer section 10 includes the first transfer roller 16, which is disposed so as to face the photoconductor drum 11 with the intermediate transfer belt 15 therebetween. The first transfer roller 16 is constituted by a shaft and a sponge layer, which is an elastic layer fixed around the shaft. The shaft is a cylindrical bar made of metal, such as iron or steel use stainless (SUS). The sponge layer is a cylindrical sponge roller which is made of a blend of NBR rubber, SBR rubber, and EPDM rubber with a conductive agent, such as carbon black, and which has a volume resistivity of $10^7$ to $10^9$ Ωcm. The first transfer roller 16 is disposed so as to be pressed against the photoconductor drum 11 with the intermediate transfer belt 15 therebetween.

Furthermore, a voltage (first transfer bias) having a polarity opposite to the polarity of the charge of the toner (for example, negative polarity) is applied to the first transfer roller 16. Accordingly, toner images on the individual photoconductor drums 11 are sequentially and electrostatically attracted to the intermediate transfer belt 15, and thereby multilayer toner images (toner images 101a and 101b illustrated in FIG. 2 described below) are formed on the intermediate transfer belt 15.

The second transfer section 20 includes the second transfer roller 22, which is disposed so as to face the backup roller 25 with the intermediate transfer belt 15 therebetween. The second transfer roller 22 is disposed on a toner image carrying surface side of the intermediate transfer belt 15, and is grounded (GND). A power feed roller 26 made of metal is disposed in contact with the backup roller 25. The power feed roller 26 is connected to a transfer bias power supply 27, which is an example of a bias power supply device for supplying a second transfer bias.

The transfer bias power supply 27 generates a second transfer bias, and stably applies the generated second transfer bias to the backup roller 25 via the power feed roller 26, which is an example of a load.

The backup roller 25 has a tubular surface made of a blend of EPDM rubber and NBR rubber dispersed with carbon, and an inner portion made of EPDM rubber. The surface resistivity of the backup roller 25 is $10^7$ to $10^{10}$ Ω/square, and the hardness thereof is set to be, for example, about 70 degrees (Asker C).

The second transfer roller 22 includes a shaft and a sponge layer, which is an elastic layer fixed around the shaft. The shaft is a cylindrical bar made of metal, such as iron or SUS. The sponge layer is a cylindrical sponge roller which is made of a blend of NBR rubber, SBR rubber, and EPDM rubber with a conductive agent, such as carbon black, and which has a volume resistivity of $10^7$ to $10^9$ Ωcm. The second transfer roller 22 is disposed so as to be pressed against the backup roller 25 with the intermediate transfer belt 15 therebetween, so as to form a transfer nip region.

The second transfer roller 22 is grounded (GND) to generate a second transfer bias between the second transfer roller 22 and the backup roller 25, and second-transfers a toner image onto the sheet P transported to the transfer nip region of the second transfer section 20.

An intermediate transfer belt cleaner 35 is disposed on the downstream side of the second transfer section 20 along the intermediate transfer belt 15 so as to be contactable with the intermediate transfer belt 15. The intermediate transfer belt cleaner 35 cleans the surface of the intermediate transfer belt 15 by removing residual toner and paper dust from the intermediate transfer belt 15 after a second transfer process ends. A reference sensor (home position sensor) 42 is disposed on the upstream side of the image forming unit 2Y for yellow. The reference sensor 42 generates a reference signal, which is a reference for adjusting image formation timings of the image forming units 2Y, 2M, 2C, and 2K. An image density sensor 43 for adjusting image quality is disposed on the downstream side of the image forming unit 2K for black.

The reference sensor 42 generates a reference signal by identifying a predetermined mark provided on the back side of the intermediate transfer belt 15. The controller 40 issues an instruction in accordance with the reference signal, and each of the image forming units 2Y, 2M, 2C, and 2K starts image formation in response to the instruction.

The image density sensor 43 detects test toner images for controlling density (test toner images 102a and 102b illustrated in FIG. 2 described below). In accordance with a detection result about the test toner images detected by the image density sensor 43, the operation conditions of the image forming units 2Y, 2M, 2C, and 2K are adjusted, and the density of toner images to be formed is adjusted.

Furthermore, the image forming apparatus 1 according to the present exemplary embodiment includes a sheet container 50, a pick-up roller 51, transport rollers 52, a sheet transport path 53, a transport belt 55, and an entrance guide 56, which constitute a sheet transport system. The sheet container 50 contains the sheet P. The pick-up roller 51 picks up the sheet P from the sheet container 50 at a predetermined timing and feeds the sheet P. The transport rollers 52 transport the sheet P fed by the pick-up roller 51. The sheet transport path 53 guides the sheet P which has been transported by the transport rollers 52 to the second transfer section 20. The transport belt 55 transports, to the fixing section 60, the sheet P on which a second transfer process has been performed by the second transfer roller 22. The entrance guide 56 guides the sheet P to the fixing section 60.

The fixing section 60 includes a heating roller 61 which has a heat source such as a halogen lamp, and a pressure roller 62 which is pressed against the heating roller 61. The sheet P onto which a toner image has been transferred is caused to pass through a fixing nip region, which is formed between the heating roller 61 and the pressure roller 62, so that the toner image is fixed onto the sheet P.

Next, a basic image formation process of the image forming apparatus 1 according to the present exemplary embodiment will be described. In the image forming apparatus 1 illustrated in FIG. 1, image data which is output from an image reading apparatus, a personal computer (PC), or the like (not illustrated) undergoes predetermined image processing performed by an image processing apparatus (not illustrated), and then undergoes an image formation operation performed by the image forming units 2Y, 2M, 2C, and 2K. The image processing apparatus performs predetermined image processing, including various image edit operations, such as shading correction using reflectivity data that is input, displacement correction, brightness/color space conversion, gamma correction, frame erasing, color adjustment, and movement. The processed image data is converted to color gradation data for four colors, Y, M, C, and K, and the color gradation data is output to the laser exposure devices 13.

In accordance with the input color gradation data, the laser exposure devices 13 irradiate the photoconductor drums 11 of the image forming units 2Y, 2M, 2C, 2K with light beams Bm emitted by, for example, semiconductor lasers. The surfaces of the photoconductor drums 11 of the image forming units 2Y, 2M, 2C, and 2K are charged by the charging devices 12, and are then scanned and exposed by the laser exposure devices 13, so that electrostatic latent images are formed on the surfaces. The formed electrostatic latent images are developed to toner images of Y, M, C, and K by the developing devices 14 of the image forming units 2Y, 2M, 2C, and 2K.

The toner images of the individual colors which have been formed on the photoconductor drums 11 of the image forming units 2Y, 2M, 2C, and 2K are transferred onto the intermediate transfer belt 15 in the first transfer sections 10, in which the individual photoconductor drums 11 come into contact with the intermediate transfer belt 15. More specifically, in the first transfer sections 10, the first transfer rollers 16 each apply a voltage (first transfer bias) having a polarity (positive polarity) opposite to the polarity of the charge of the toner to a base of the intermediate transfer belt 15, and the toner images are sequentially transferred onto the surface of the intermediate transfer belt 15. In this way, a first transfer process is performed.

After the toner images have been sequentially transferred onto the surface of the intermediate transfer belt 15, the intermediate transfer belt 15 is rotated so that the toner images are transported to the second transfer section 20. In synchronization with the timing at which the toner images are transported to the second transfer section 20, the pick-up roller 51 in the sheet transport system starts rotating, and the sheet P having a predetermined size is fed from the sheet container 50. The sheet P fed by the pick-up roller 51 is transported by the transport rollers 52, and reaches the second transfer section 20 via the sheet transport path 53. Before reaching the second transfer section 20, the sheet P is temporarily stopped. A registration roller (not illustrated) rotates in synchronization with a rotation timing of the intermediate transfer belt 15 which carries the toner images, and thereby the position of the sheet P and the position of the toner images are adjusted.

In the second transfer section 20, the second transfer roller 22 is pressed against the backup roller 25 with the intermediate transfer belt 15 therebetween. At this time, the sheet P which has been transported at an appropriate timing is nipped between the intermediate transfer belt 15 and the second transfer roller 22 (transfer nip region). Then, a voltage (transfer electric field of a negative voltage (transfer bias)) having a polarity (negative polarity) that is the same as the polarity of the charge of the toner is applied from the transfer bias power supply 27 to the backup roller 25 via the power feed roller 26. Accordingly, a transfer electric field is generated between the second transfer roller 22 and the backup roller 25. Then, the unfixed toner images carried on the intermediate transfer belt 15 are simultaneously and electrostatically transferred onto the sheet P in the second transfer section 20, where the toner images are pressed by the second transfer roller 22 and the backup roller 25.

Though details will be described below, test toner images carried on the intermediate transfer belt 15 are not electrostatically transferred onto the sheet P. Thus, the transfer bias power supply 27 supplies, to the backup roller 25 via the power feed roller 26, a voltage (non-transfer electric field of a positive voltage (non-transfer bias)) having a polarity (positive polarity) opposite to the polarity of the charge of the toner. This suppresses the adhesion of the toner forming the test toner images to the second transfer roller 22. That is, the transfer bias power supply 27 supplies a positive-polarity voltage (positive voltage) and a negative-polarity voltage (negative voltage) by switching therebetween.

Here, the positive voltage is an example of a voltage of a first polarity, and the negative voltage is an example of a voltage of a second polarity.

After that, the sheet P onto which the toner images have been electrostatically transferred is peeled off the intermediate transfer belt 15 by the second transfer roller 22 and is transported to the transport belt 55, which is disposed on the downstream side of the second transfer roller 22 in the sheet transport direction. The transport belt 55 transports the sheet P to the fixing section 60 at an optimum transport speed, in accordance with the transport speed in the fixing section 60. The unfixed toner images on the sheet P which has been transported to the fixing section 60 undergo a fixing process, which is performed by the fixing section 60 with heat and pressure, and thereby being fixed onto the sheet P. Then, the sheet P having a fixed image thereon is transported to an output sheet stacker (not illustrated) provided in an output section of the image forming apparatus 1.

After the toner images have been transferred onto the sheet P, residual toner on the intermediate transfer belt 15 (including the test toner images) is transported in accordance with the rotation of the intermediate transfer belt 15, and is removed from the intermediate transfer belt 15 by the cleaning backup roller 34 and the intermediate transfer belt cleaner 35.

Toner Images 101a and 101b, and Test Toner Images 102a and 102b

Figure 2:
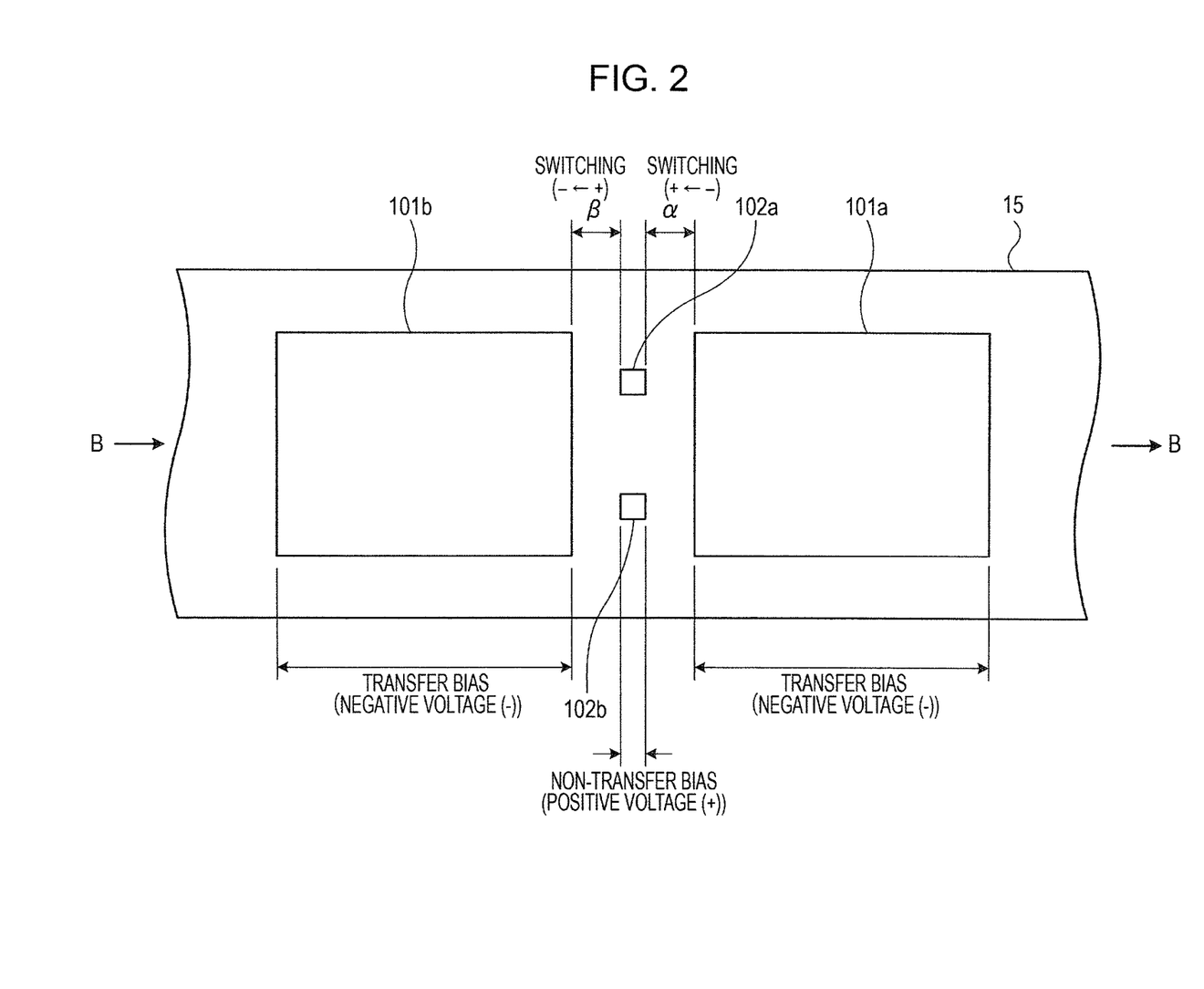
FIG. 2 is a diagram describing toner images and test toner images on an intermediate transfer belt.

FIG. 2 is a diagram describing the toner images 101a and 101b and the test toner images 102a and 102b on the intermediate transfer belt 15. FIG. 2 illustrates a part of the intermediate transfer belt 15 viewed from the second transfer roller 22 side in the second transfer section 20 illustrated in FIG. 1. The intermediate transfer belt 15 rotates in the direction indicated by the arrow B.

First, in the first transfer sections 10 in the image forming units 2Y, 2M, 2C, and 2K illustrated in FIG. 1, toner images of the individual colors formed on the individual photoconductor drums 11 are superposed on the intermediate transfer belt 15, and thereby the toner image 101a is formed. Subsequently, like the toner image 101a, in the first transfer sections 10 in the image forming units 2Y, 2M, 2C, and 2K, test toner images of the individual colors formed on the individual photoconductor drums 11 are superposed on the intermediate transfer belt 15, and thereby the test toner images 102a and 102b are formed. Subsequently, in the first transfer sections 10 in the image forming units 2Y, 2M, 2C, and 2K, toner images of the individual colors formed on the individual photoconductor drums 11 are superposed on the intermediate transfer belt 15, and thereby the toner image 101b is formed. Here, each of the toner images 101a and 101b is referred to as a toner image 101 when they are not distinguished from each other, and each of the test toner images 102a and 102b is referred to as a test toner image 102 when they are not distinguished from each other.

As described above, in the image forming apparatus 1 according to the present exemplary embodiment, toner images 101 and test toner images 102 are alternately and repeatedly formed on the intermediate transfer belt 15.

Here, the two test toner images 102a and 102b are provided in parallel along the direction orthogonal to the rotation direction of the intermediate transfer belt 15 (the direction indicated by the arrow B). Alternatively, one test toner image 102 may be formed so as to be displaced along the rotation direction of the intermediate transfer belt 15. The test toner images 102 are used for adjusting the density of toner images to be formed in the image forming units 2Y, 2M, 2C, and 2K in accordance with a detection result generated by the image density sensor 43.

A registration roller (not illustrated) rotates in synchronization with a rotation timing of the intermediate transfer belt 15, and thereby the position of the sheet P and the position of the toner image 101 are adjusted. Then, the toner images 101a and 101b are sequentially transferred onto the sheet P which has been transported. However, the test toner images 102a and 102b are not transferred onto the sheet P.

Thus, for the toner images 101a and 101b, a transfer bias of a negative voltage is applied to the backup roller 25 via the power feed roller 26, so that the toner images 101a and 101b are transferred onto the sheep P. On the other hand, for the test toner images 102a and 102b, a non-transfer bias of a positive voltage is applied to the backup roller 25 via the power feed roller 26.

In a case where the charge polarity of toner is positive, a transfer bias of a positive voltage is applied to the backup roller 25 via the power feed roller 26 for the toner images 101a and 101b, and a non-transfer bias of a negative voltage is applied to the backup roller 25 via the power feed roller 26 for the test toner images 102a and 102b.

In a region α between the toner image 101a and the test toner images 102a and 102b, the transfer bias power supply 27 switches the output voltage (output voltage Vout in FIG. 3) from a transfer bias of a negative voltage to a non-transfer bias of a positive voltage. In a region β between the test toner images 102a and 102b and the toner image 101b, the transfer bias power supply 27 switches the output voltage from a non-transfer bias of a positive voltage to a transfer bias of a negative voltage.

In order to increase the operation speed of the image forming apparatus 1, it is demanded to shorten (suppress) the time period in which the output voltage is switched in the region α and the region β.

Circuit Blocks of Transfer Bias Power Supply 27

Figure 3:
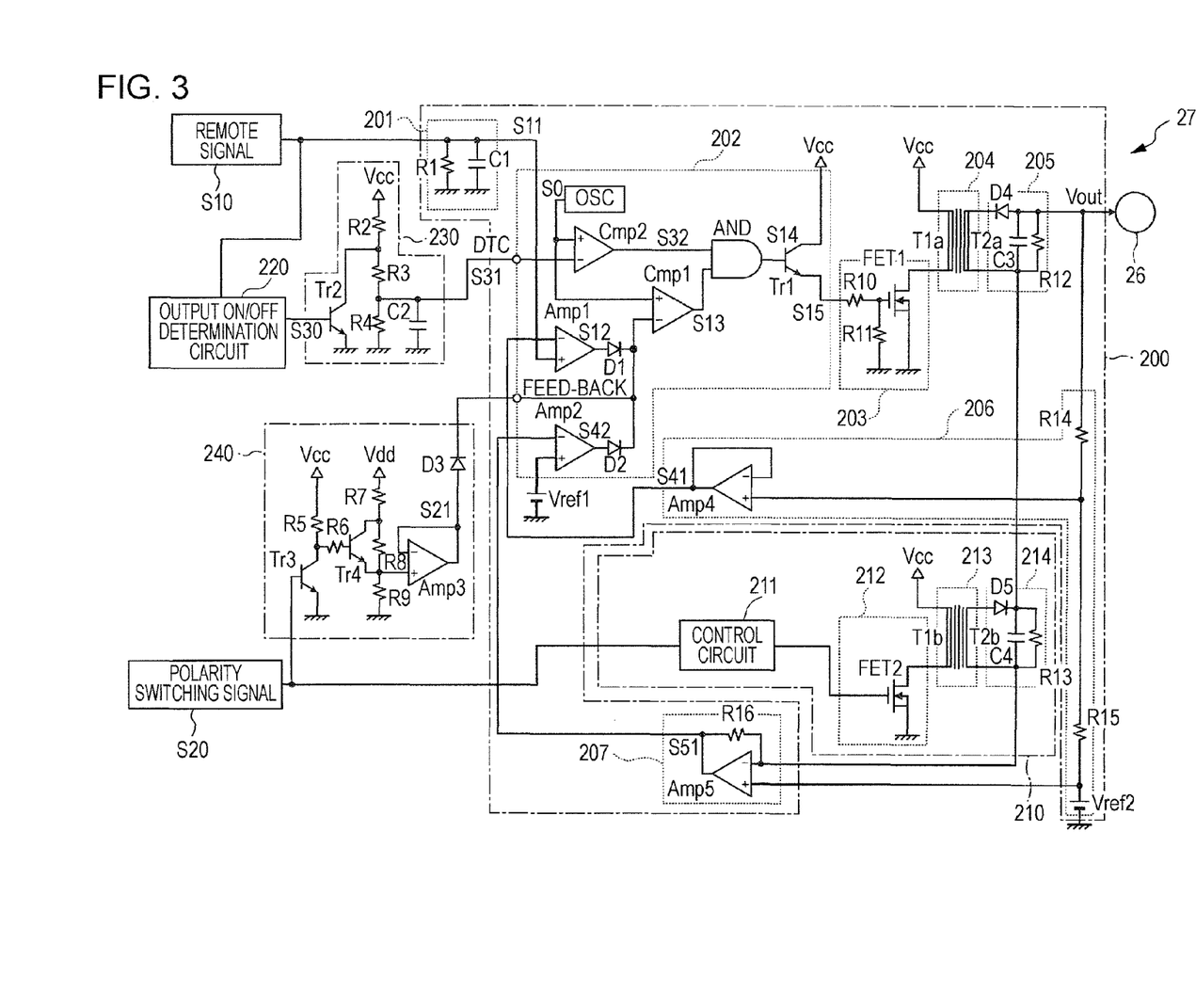
FIG. 3 is a diagram illustrating an example of circuit blocks and a circuit configuration of a transfer bias power supply according to the exemplary embodiment.

FIG. 3 is a diagram illustrating an example of circuit blocks and a circuit configuration of the transfer bias power supply 27 according to the present exemplary embodiment.

The transfer bias power supply 27 includes, as surrounded by chained lines in FIG. 3, a negative voltage generating unit 200, a positive voltage generating unit 210, an output on/off determining circuit 220, a dead-time control (DTC) circuit 230, and a switching circuit 240. The negative voltage generating unit 200 generates a transfer bias of a negative polarity and is an example of a second power supply unit. The positive voltage generating unit 210 generates a non-transfer bias of a positive polarity and is an example of a first power supply unit. The DTC circuit 230 is an example of a first switching controller. The switching circuit 240 is an example of a second switching controller.

First, the configuration of the circuit blocks of the transfer bias power supply 27 will be described.

The negative voltage generating unit 200 includes, as circuit blocks, an analog conversion circuit 201, a control circuit 202, a driving circuit 203, a transformer 204, a rectifier circuit 205, an output voltage detecting circuit 206, and an output current detecting circuit 207.

The negative voltage generating unit 200 generates a transfer bias of a negative polarity.

On the other hand, the positive voltage generating unit 210 includes, as circuit blocks, a control circuit 211, a driving circuit 212, a transformer 213, and a rectifier circuit 214.

The positive voltage generating unit 210 generates a non-transfer bias of a positive polarity.

As illustrated in FIG. 3, the rectifier circuit 205 of the negative voltage generating unit 200 and the rectifier circuit 214 of the positive voltage generating unit 210 are connected in series. Accordingly, a negative voltage (transfer bias) generated by the negative voltage generating unit 200 and a positive voltage (non-transfer bias) generated by the positive voltage generating unit 210 are switched between and supplied to the power feed roller 26.

In the present exemplary embodiment, a remote signal S10 illustrated in FIG. 3 is a pulse-width-modulated signal (PWM signal) which sets the value of a negative voltage (transfer bias) to be output from the negative voltage generating unit 200. The remote signal S10 has two voltage levels, which are a high level (hereinafter "H") and a low level (hereinafter "L"). The remote signal S10 becomes a PWM signal having an amplitude between "L" and "H" when the transfer bias power supply 27 outputs a negative voltage, and comes into an "L" state when the transfer bias power supply 27 outputs a positive voltage. As will be described below, the remote signal S10 does not change in accordance with a polarity switching signal S20 (described below) in some cases. The remote signal S10 is transmitted to the transfer bias power supply 27 by the controller 40.

The polarity switching signal S20 is a signal for switching the polarity of the output voltage Vout of the transfer bias power supply 27. When the polarity switching signal S20 shifts from "H" to "L", an instruction to switch the output voltage Vout from a negative voltage to a positive voltage is provided. On the other hand, when the polarity switching signal S20 shifts from "L" to "H", an instruction to switch the output voltage Vout from a positive voltage to a negative voltage is provided. The polarity switching signal S20 is transmitted to the transfer bias power supply 27 by the controller 40.

Circuit Configuration of Transfer Bias Power Supply 27

Next, the circuit configuration of the transfer bias power supply 27 will be described.

First, the negative voltage generating unit 200 will be described.

Analog Conversion Circuit 201

The controller 40 transmits a pulse-width-modulated remote signal S10 which sets the value of a negative voltage (transfer bias) to be output from the negative voltage generating unit 200. Then, the analog conversion circuit 201 receives the remote signal S10, smoothes the remote signal S10 to convert it to a direct current, and outputs the direct current as a setting signal S11.

As illustrated in FIG. 3, the analog conversion circuit 201 includes a resistor R1 and a capacitor C1. One terminal of the resistor R1 and one terminal of the capacitor C1 are connected to each other and serve as an input terminal and an output terminal. The other terminal of the resistor R1 and the other terminal of the capacitor C1 are grounded (GND).

In the analog conversion circuit 201, the pulse-width-modulated remote signal S10 received from the controller 40 is stored in the capacitor C1, and thereby the remote signal S10 is smoothed to be converted to the setting signal S11 of a DC voltage. At this time, the voltage of the setting signal S11 is set in proportional to the duty ratio of the remote signal S10. That is, when the duty ratio of the remote signal S10 is high, a voltage at one terminal of the capacitor C1 increases and the voltage of the setting signal S11 increases, compared to when the duty ratio is low. On the other hand, when the duty ratio of the remote signal S10 is low, a voltage at one terminal of the capacitor C1 decreases and the voltage of the setting signal S11 decreases, compared to when the duty ratio is high.

The resistor R1 sets time constants for charging and discharging of the capacitor C1.

If the remote signal S10 is an analog signal, not a pulse-width-modulated signal (PWM signal), the analog signal may be affected by noise or the like while being transmitted from the controller 40 to the transfer bias power supply 27, and the voltage of the analog signal may be changed. For this reason, the remote signal S10 is a PWM signal, so that an influence of noise is suppressed.

When it is not necessary to suppress an influence of noise, the remote signal S10 may be an analog signal, and the analog conversion circuit 201 may be omitted.

Control Circuit 202

The control circuit 202 performs feedback control to reduce the difference between a negative voltage to be output by the negative voltage generating unit 200 and a value set by the setting signal S11. The negative voltage generating unit 200 is a separately excited switching power supply, and includes an oscillator OSC in the control circuit 202.

Here, the oscillator OSC outputs triangular waves. Alternatively, the oscillator OSC may output a signal capable of generating a PWM signal, such as saw-tooth waves.

The control circuit 202 includes the oscillator OSC that oscillates a triangular wave or a saw-tooth wave, comparators Cmp1 and Cmp2, error amplifiers Amp1 and Amp2, an npn transistor Tr1, an AND-circuit AND, and diodes D1 and D2.

An output terminal of the oscillator OSC is connected to a non-inversion input terminal (hereinafter referred to as a positive input terminal) of the comparator Cmp1 and a positive input terminal of the comparator Cmp2.

An inversion input terminal (hereinafter referred to as a negative input terminal) of the comparator Cmp1 is connected to an output terminal of the error amplifier Amp1 via the diode D1, and to an output terminal of the error amplifier Amp2 via the diode D2. Also, the negative input terminal of the comparator Cmp1 is connected to a feed-back control terminal (feed-back terminal). The feed-back terminal is connected to the switching circuit 240.

A negative input terminal of the comparator Cmp2 is connected to a dead-time control terminal (DTC terminal). The DTC terminal is connected to the DTC circuit 230.

An output terminal of the comparator Cmp1 and an output terminal of the comparator Cmp2 are connected to input terminals of the two-input AND-circuit AND.

An output terminal of the AND-circuit AND is connected to a base terminal of the npn transistor Tr1.

An emitter terminal of the npn transistor Tr1 is connected to the driving circuit 203. A collector terminal of the npn transistor Tr1 is connected to a power supply voltage Vcc (for example, 24 V).

A positive input terminal of the error amplifier Amp1 is connected to the analog conversion circuit 201, and receives the setting signal S11. A negative input terminal of the error amplifier Amp1 is connected to the output voltage detecting circuit 206.

A reference voltage Vref1 is supplied to a positive input terminal of the error amplifier Amp2. A negative input terminal of the error amplifier Amp2 is connected to the output current detecting circuit 207.

The error amplifier Amp1 compares the setting signal S11 with a signal S41, which is proportional to the output voltage Vout detected by the output voltage detecting circuit 206, amplifies the difference therebetween, and outputs the difference as an output signal S12.

The error amplifier Amp2 compares the reference voltage Vref1 with a signal S51, which is proportional to a current which flows via the power feed roller 26 due to the output voltage Vout detected by the output current detecting circuit 207, amplifies the difference therebetween, and outputs the difference as an output signal S42.

A triangular wave S0 output from the oscillator OSC is input to the positive input terminal of the comparator Cmp1.

The output signal S12 of the error amplifier Amp1, the output signal S42 of the error amplifier Amp2, and an output signal S21 of the switching circuit 240 are input to the negative input terminal of the comparator Cmp1.

The diode D1 is provided between the error amplifier Amp1 and the negative input terminal of the comparator Cmp1, and the diode D2 is provided between an error amplifier Amp2 and the negative input terminal of the comparator Cmp1. A diode D3 is provided between an error amplifier Amp3 of the switching circuit 240 and the negative input terminal of the comparator Cmp1. Cathode terminals of the diodes D1, D2, and D3 are connected to the negative input terminal of the comparator Cmp1.

Accordingly, the negative input terminal of the comparator Cmp1 selects and receives a signal having the highest voltage among the output signal S12 of the error amplifier Amp1, the output signal S42 of the error amplifier Amp2, and the output signal S21 of the switching circuit 240.

In the following description, voltage drop caused by the diodes D1, D2, and D3 is not considered.

Thus, the comparator Cmp1 compares the triangular wave S0 output from the oscillator OSC with the signal received by the negative input terminal. If the magnitude of the triangular wave S0 is larger than that of the signal received by the negative input terminal, the comparator Cmp1 outputs a pulse-width-modulated output signal S13 of a high level (hereinafter "H"). If the magnitude of the triangular wave S0 is smaller than that of the signal received by the negative input terminal, the comparator Cmp1 outputs a pulse-width-modulated output signal S13 of a low level (hereinafter "L").

The triangular wave S0 output from the oscillator OSC is input to the positive input terminal of the comparator Cmp2.

An output signal S31 output from the DTC circuit 230 is input to the negative input terminal of the comparator Cmp2.

The comparator Cmp2 compares the triangular wave S0 output from the oscillator OSC with the output signal S31 of the DTC circuit 230. If the triangular wave S0 is larger than the output signal S31, the comparator Cmp2 outputs a pulse-width modulated output signal S32 of "H". If the triangular wave S0 is smaller than the output signal S31, the comparator Cmp2 outputs a pulse-width modulated output signal S32 of "L".

The AND-circuit AND performs AND calculation on the output signal S13 of the comparator Cmp1 and the output signal S32 of the comparator Cmp2, and outputs an output signal S14. The output signal S14 is also a pulse-width-modulated signal, as will be described below.

The output signal S14 turns on/off the npn transistor Tr1, so that the control circuit 202 outputs a pulse-width-modulated output signal S15 having an amplitude between the power supply voltage Vcc (24 V) and the ground (GND).

The comparators Cmp1 and Cmp2, the error amplifiers Amp1 and Amp2, and the AND-circuit AND will be further described below together with the operation of the transfer bias power supply 27.

Driving Circuit 203

The driving circuit 203 receives the output signal S15 from the control circuit 202, performs switching (on/off) of a switch element (a field-effect transistor FET1, which will be described below), and thereby controls a current which flows through a primary winding (a primary winding T1a, which will be described below) of the transformer 204.

The driving circuit 203 includes resistors R10 and R11 and the field-effect transistor FET1.

One terminal of the resistor R10 is connected to the emitter terminal of the npn transistor Tr1 of the control circuit 202. The other terminal of the resistor R10 is connected to one terminal of the resistor R11 and is also connected to a gate terminal of the field-effect transistor FET1. The other terminal of the resistor R11 is grounded (GND).

A source terminal of the field-effect transistor FET1 is grounded (GND). A drain terminal of the field-effect transistor FET1 is connected to the transformer 204.

When the npn transistor Tr1 of the control circuit 202 is turned on, the voltage at the gate terminal of the field-effect transistor FET1 becomes the power supply voltage Vcc (24 V) via the npn transistor Tr1 and the resistor R10, and thereby the field-effect transistor FET1 is turned on. When the npn transistor Tr1 of the control circuit 202 is turned off, the voltage at the gate terminal of the field-effect transistor FET1 becomes the ground voltage GND via the resistor R11, and thereby the field-effect transistor FET1 is turned off.

That is, the field-effect transistor FET1 of the driving circuit 203 is switched (on/off) in accordance with on/off of the npn transistor Tr1 of the control circuit 202.

Transformer 204

The transformer 204 includes the primary winding T1a and a secondary winding T2a. A current which flows through the primary winding T1a induces a current which flows through the secondary winding T2a.

The power supply voltage Vcc (24 V) is supplied to one terminal of the primary winding T1a. The other terminal of the primary winding T1a is connected to the drain terminal of the field-effect transistor FET1 of the driving circuit 203.

The secondary winding T2a is connected to the rectifier circuit 205.

When the field-effect transistor FET1 of the driving circuit 203 is turned on, a current flows between the power supply voltage Vcc and the ground via the primary winding T1a and the field-effect transistor FET1. A current which flows through the primary winding T1a induces a voltage corresponding to the winding ratio of the primary winding T1a to the secondary winding T2a at the secondary winding T2a.

Rectifier circuit 205

The rectifier circuit 205 rectifies a current induced at the secondary winding T2a of the transformer 204, and generates a negative voltage (transfer bias).

The rectifier circuit 205 includes a diode D4, a capacitor C3, and a resistor R12.

A cathode terminal of the diode D4 is connected to one terminal of the secondary winding T2a. An anode terminal of the diode D4 is connected to one terminals of the capacitor C3 and the resistor R12 which are connected in parallel, and is also connected to the power feed roller 26. The other terminals of the capacitor C3 and the resistor R12 which are connected in parallel are connected to the other terminal of the secondary winding T2a.

In the current induced at the secondary winding T2a of the transformer 204, a current which flows through the diode D4 causes the capacitor C3 to be charged, and thereby a negative voltage (transfer bias) is generated.

Output Voltage Detecting Circuit 206

The output voltage detecting circuit 206 detects a value of the output voltage Vout, and outputs the signal S41 of a voltage which is proportional to the output voltage Vout.

The output voltage detecting circuit 206 includes an error amplifier Amp4 and resistors R14 and R15. The resistors R14 and R15 are connected in series. The terminal of the resistor R14 which is not connected to the resistor R15 is connected to the power feed roller 26. The terminal of the resistor R15 which is not connected to the resistor R14 is grounded via a reference voltage Vref2 (for example, 5 V).

A positive input terminal of the error amplifier Amp4 is connected to a connection point between the resistors R14 and R15, and a negative input terminal is connected to an output terminal of the error amplifier Amp4. The output terminal (signal S41) of the error amplifier Amp4 is connected to the negative input terminal of the error amplifier Amp1 of the control circuit 202.

The error amplifier Amp4 detects the output voltage Vout divided by the resistors R14 and R15, and outputs the signal S41 whose voltage is proportional to the output voltage Vout.

The reference voltage Vref2 is a bias voltage which suppresses that the voltage at the positive input terminals of the error amplifier Amp4 and an error amplifier Amp5 (described below) become a negative voltage.

Output Current Detecting Circuit 207

The output current detecting circuit 207 detects a current which flows, due to the output voltage Vout applied to the power feed roller 26, from the power feed roller 26 to the ground (GND) through the intermediate transfer belt 15, the sheet P, the backup roller 25, and the second transfer roller 22, and outputs the signal S51 which is proportional to the current.

The output current detecting circuit 207 includes the error amplifier Amp5 and a resistor R16. A positive input terminal of the error amplifier Amp5 is connected to a connection point between the resistor R15 of the output voltage detecting circuit 206 and the reference voltage Vref2. A negative input terminal of the error amplifier Amp5 is connected to the rectifier circuit 214 of the positive voltage generating unit 210 which will be describe below, and is also connected to an output terminal of the error amplifier Amp5 via the resistor R16. The output terminal (signal S51) of the error amplifier Amp5 is connected to the negative input terminal of the error amplifier Amp2 of the control circuit 202.

Next, the positive voltage generating unit 210 will be described. Here, the positive voltage generating unit 210 is a self-excited switching power supply.

Control Circuit 211

The control circuit 211 is activated when the polarity switching signal S20 shifts from "H" to "L", and generates and outputs a voltage which turns on a field-effect transistor FET2, which is a switch element of the driving circuit 212.

Driving Circuit 212

The driving circuit 212 includes the field-effect transistor FET2. A gate terminal of the field-effect transistor FET2 is connected to the control circuit 211. A source terminal of the field-effect transistor FET2 is grounded, and a drain terminal is connected to the transformer 213.

Transformer 213

The transformer 213 includes a primary winding T1b and a secondary winding T2b. The power supply voltage Vcc is supplied to one terminal of the primary winding T1b. The other terminal of the primary winding T1b is connected to the drain terminal of the field-effect transistor FET2 of the driving circuit 212.

The secondary winding T2b is connected to the rectifier circuit 214.

Rectifier Circuit 214

The rectifier circuit 214 rectifies a current induced at the secondary winding Tb2, and generates a positive voltage (non-transfer bias).

The rectifier circuit 214 includes a diode D5, a capacitor C4, and a resistor R13.

An anode terminal of the diode D5 is connected to one terminal of the secondary winding Tb2. A cathode terminal of the diode D5 is connected to one terminals of the capacitor C4 and the resistor R13 which are connected in parallel. The other terminals of the capacitor C4 and the resistor R13 which are connected in parallel are connected to the other terminal of the secondary winding Tb2. The diode D5 has a configuration similar to that of the diode D4 in the rectifier circuit 205 of the negative voltage generating unit 200. However, the direction in which current flows therethrough is opposite. Accordingly, a positive voltage is generated.

The one terminals of the capacitor C4 and the resistor R13 which are connected in parallel are connected to the other terminals of the capacitor C3 and the resistor R12 which are connected in parallel in the rectifier circuit 205 of the negative voltage generating unit 200.

The other terminals of the capacitor C4 and the resistor R13 which are connected in parallel are connected to the negative input terminal of the error amplifier Amp5 of the output current detecting circuit 207.

When the field-effect transistor FET2 of the driving circuit 212 is turned on, a current flows between the power supply voltage Vcc (24 V) and the ground (GND) through the primary winding T1b and the field-effect transistor FET2. When a current flows through the primary winding T1b, a voltage is induced at the secondary winding T2b. However, the direction of this voltage is opposite to that for causing a current to flow through the diode D5, and thus no current flows.

In this period, the current which flows through the field-effect transistor FET2 increases. However, there is a limit of current which is allowed to flow through the field-effect transistor FET2, and thus a current does not flow beyond the limit. Then, a voltage causing a current to flow is induced at the primary winding T1b, thereby the drain voltage of the field-effect transistor FET2 decreases, and the field-effect transistor FET2 is turned off. At this time, the voltage induced at the primary winding T1b induces, at the secondary winding T2b, a voltage causing a current to flow through the diode D5. Accordingly, a positive voltage is generated.

Output on/Off Determining Circuit 220

The output on/off determining circuit 220 detects a change of the remote signal S10, and outputs an output signal S30 which controls the DTC circuit 230.

The output on/off determining circuit 220 outputs "H" in a period over which the remote signal S10, which is a PWM signal, is output, and outputs "L" in a period over which the remote signal S10 is not output (is kept at "L").

The output signal S30 of the output on/off determining circuit is connected to the DTC circuit 230.

The output on/off determining circuit 220 drives the DTC circuit 230, which will be described below, so as to prevent a negative voltage (transfer bias) from being suddenly applied to the power feed roller 26. The output on/off determining circuit 220 detects the remote signal S10 for setting a negative voltage, and outputs the output signal S30.

The output on/off determining circuit 220 may be controlled by using the polarity switching signal S20.

The output on/off determining circuit 220 having such a function converts a PWM signal to an analog voltage and detects the voltage of an analog signal, like the analog conversion circuit 201.

DTC Circuit 230

When the output voltage Vout of the transfer bias power supply 27 is switched from a positive voltage (non-transfer bias) to a negative voltage (transfer bias), the DTC circuit 230 outputs the output signal S31 for performing control so that the output voltage Vout is moderately changed from a positive voltage to a negative voltage.

The DTC circuit 230 includes an npn transistor Tr2, resistors R2, R3, and R4, and a capacitor C2.

The resistors R2, R3, and R4 are connected in series. The power supply voltage Vcc is supplied to the terminal of the resistor R2 which is not connected to the resistor R3, and the terminal of the resistor R4 which is not connected to the resistor R3 is grounded (GND).

A base terminal of the npn transistor Tr2 is connected to the output on/off determining circuit 220. An emitter terminal of the npn transistor Tr2 is grounded. A collector terminal of the npn transistor Tr2 is connected to a connection point between the resistors R2 and R3.

One terminal of the capacitor C2 is an output terminal of the DTC circuit 230, and is connected to the negative input terminal of the comparator Cmp2 of the control circuit 202 via the DTC terminal.

When the output terminal of the output on/off determining circuit 220 is "L", the npn transistor Tr2 is turned off, and the capacitor C2 is charged by the power supply voltage Vcc via the resistors R2 and R3. It is assumed that the voltage at one terminal of the capacitor C2 (output signal S31 of the DTC circuit 230) becomes a voltage generated by dividing the power supply voltage Vcc by the resistors R2, R3, and R4 connected in series, for example, a voltage of 4.5 V or more (here, 5 V for easy understanding).

When the output terminal of the output on/off determining circuit 220 shifts from "L" to "H", the npn transistor Tr2 is turned on. Then, the charge stored in the capacitor C2 flows to the ground (GND) via the resistor R3 and the npn transistor Tr2 and via the resistor R4. Accordingly, the voltage at one terminal of the capacitor C2 (the output signal S31 of the DTC circuit 230) becomes, for example, a voltage of 0.7 V or less (here, 0 V for easy understanding).

In accordance with the capacitance of the capacitor C2, the time period in which the voltage at one terminal of the capacitor C2 (the output signal S31 of the DTC circuit 230) decreases from 5 V to 0 V may be set.

As will be described below, the DTC circuit 230 starts the operation of the control circuit 202 when the output on/off determining circuit 220 determines that the remote signal S10 has become a PWM signal.

Switching Circuit 240

The controller 40 transmits the polarity switching signal S20 for switching the polarity of the output voltage Vout of the transfer bias power supply 27. The switching circuit 240 receives the polarity switching signal S20. In a case where the output voltage Vout of the transfer bias power supply 27 is switched from a negative voltage to a positive voltage, the switching circuit 240 generates and outputs the output signal S21, which functions to stop the operation of the control circuit 202.

The switching circuit 240 includes npn transistors Tr3 and Tr4, the error amplifier Amp3, resistors R5, R6, R7, R8, and R9, and a diode D3.

A base terminal of the npn transistor Tr3 receives the polarity switching signal S20. An emitter terminal of the npn transistor Tr3 is grounded (GND). A collector terminal of the npn transistor Tr3 is connected to the power supply voltage Vcc (24 V) via the resistor R5, and is also connected to a base terminal of the npn transistor Tr4 via the resistor R6. The resistors R7, R8, and R9 are connected in series. The power supply voltage Vdd (for example, 5 V) is supplied to the terminal of the resistor R7 which is not connected to the resistor R8. The terminal of the resistor R9 which is not connected to the resistor R8 is grounded.

An emitter terminal of the npn transistor Tr4 is connected to a connection point between the resistors R8 and R9, and is also connected to a positive input terminal of the error amplifier Amp3. A collector terminal of the npn transistor Tr4 is connected to a connection point between the resistors R7 and R8.

A negative input terminal of the error amplifier Amp3 is connected to an output terminal of the error amplifier Amp3. The output terminal of the error amplifier Amp3 is connected to an anode terminal of the diode D3. The cathode terminal of the diode D3 is connected to the negative input terminal of the comparator Cmp1 of the control circuit 202 via the feed-back terminal.

Here, the output signal S21 is an output signal of the error amplifier Amp3.

When the polarity switching signal S20 is "L", the voltage at the base terminal of the npn transistor Tr3 is 0 V, and the npn transistor Tr3 is turned off. The base terminal of the npn transistor Tr4 is connected to the power supply voltage Vcc (24 V) via the resistors R5 and R6, and thus the npn transistor Tr4 is turned on. Then, the npn transistor Tr4 which has been turned on causes the resistor R8 to be short-circuited, and the voltage at the positive input terminal of the error amplifier Amp3 becomes a voltage which is generated by dividing the power supply voltage Vdd by the resistors R7 and R9. Accordingly, the voltage at the output terminal of the error amplifier Amp3 (the output signal S21) becomes, for example, 4.5 V or more. Hereinafter, description will be given under the assumption that the output signal S21 is 5 V when the polarity switching signal S20 is "L".

On the other hand, when the polarity switching signal S20 is "H", the emitter-base of the npn transistor Tr3 is forward-biased, and the npn transistor Tr3 is turned on. Then, the npn transistor Tr3 causes the base terminal of the npn transistor Tr4 to be drawn to the ground (GND), the emitter-base of the npn transistor Tr4 is reverse-biased, and the npn transistor Tr4 is turned off. Then, the voltage at the positive input terminal of the error amplifier Amp3 becomes a voltage obtained through division by the resistors R7, R8, and R9. Accordingly, the voltage at the output terminal of the error amplifier Amp3 (output signal S21) becomes, for example, 0.7 V or less. Hereinafter, description will be given under the assumption that the output signal S21 is 0 V when the polarity switching signal S20 is "H".

As described above, the voltage at the output terminal of the error amplifier Amp3 (output signal S21) is 5 V when the polarity switching signal S20 is "L", and is o V when the polarity switching signal S20 is "H".

The circuit configuration of the transfer bias power supply 27 illustrated in FIG. 3 is an example, and is illustrated as an equivalent circuit. The transfer bias power supply 27 may have other circuits or components.

The configuration of the control circuit 202 may be modified as long as it is capable of turning on/off the field-effect transistor FET1. Thus, the control circuit 202 may have another configuration and may include other circuits. Also, the control circuit 202 may be configured as an integrated circuit (IC) which controls a switching power supply for generating an AC or DC voltage by switching a switch element (in the present exemplary embodiment, the field-effect transistor FET1).

In FIG. 3, the positive voltage generating unit 210 is a self-excited switching power supply. Alternatively, the positive voltage generating unit 210 may be a separately excited switching power supply, like the negative voltage generating unit 200.

Operation of Transfer Bias Power Supply 27

Figure 4:
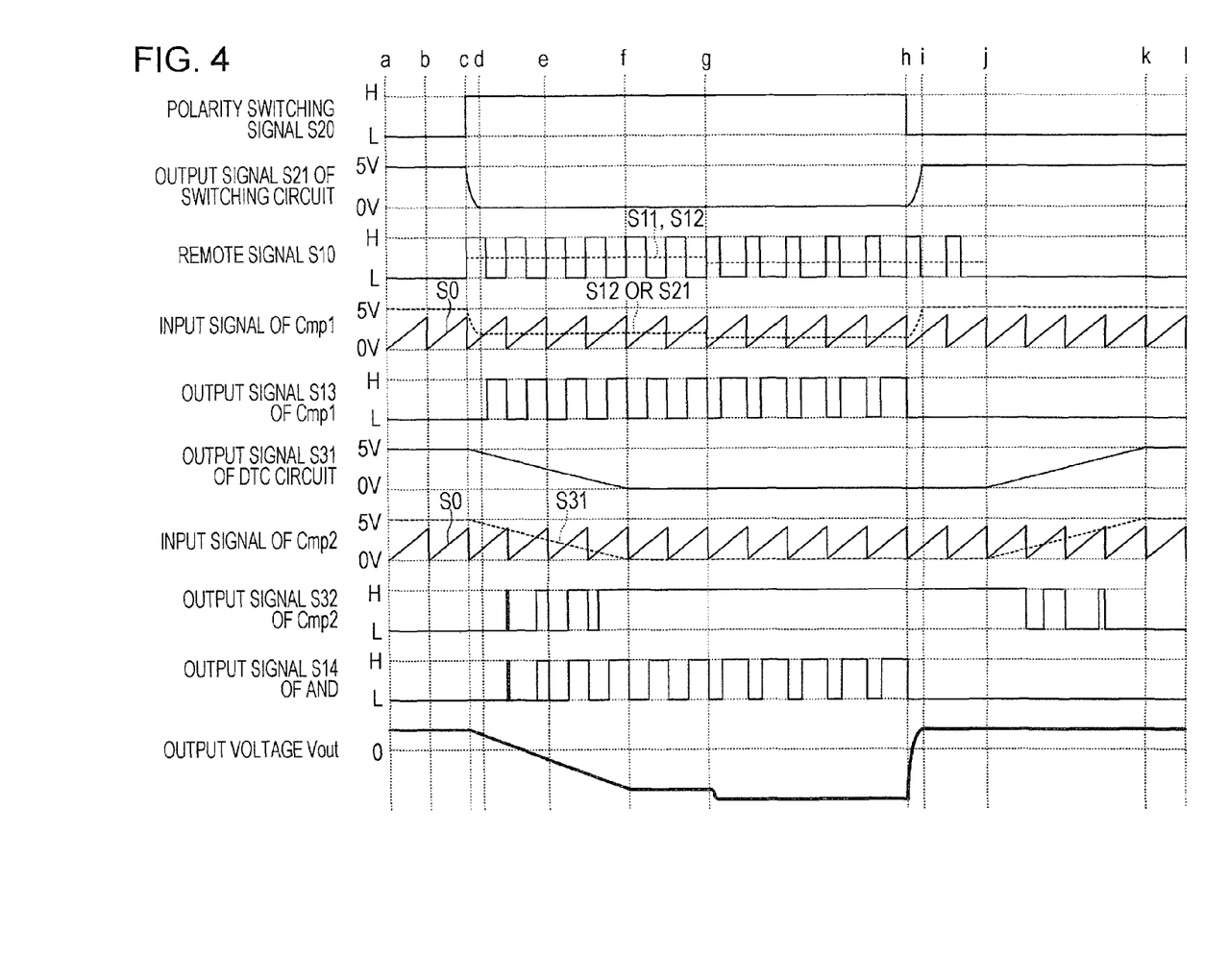
FIG. 4 is a timing chart describing an operation of the transfer bias power supply.

Next, the operation of the transfer bias power supply 27 will be described.

FIG. 4 is a timing chart describing the operation of the transfer bias power supply 27. FIG. 4 illustrates the polarity switching signal S20, the output signal S21 of the switching circuit 240, the remote signal S10, the input signal of the comparator Cmp1, the output signal S13 of the comparator Cmp1, the output signal S31 of the DTC circuit 230, the input signal of the comparator Cmp2, the output signal S14 of the AND-circuit AND, and the output voltage Vout.

It is assumed that the difference between the output voltage Vout set by the remote signal S10 and the actual output voltage Vout is small, and the signal S41 which is output from the output voltage detecting circuit 206 and received by the negative input terminal of the error amplifier Amp1 is ignored. Also, it is assumed that the output signal S12 of the error amplifier Amp1 is set by the setting signal S11 input to the positive input terminal. Thus, the output signal S12 is referred to as the output signal S12 (S11). In FIG. 4, the output signal S12 (S11) is expressed by a broken line in the part of the remote signal S10.

Also, it is assumed that there is no overcurrent in the power feed roller 26, and the signal S51 output from the output current detecting circuit 207 is ignored.

Thus, the signal input to the negative input terminal of the comparator Cmp1 is a signal having a higher voltage among the output signal S12 (S11) of the error amplifier Amp1 and the output signal S21 of the switching circuit 240 (in FIG. 4, (S12 OR S21)).

The input signal of the comparator Cmp2 corresponds to the triangular wave S0 of the oscillator OSC input to the positive input terminal and the output signal S31 of the DTC circuit 230 input to the negative input terminal.

In FIG. 4, time elapses in alphabetical order (a, b, c, . . . ).

FIG. 4 illustrates a case where the output voltage Vout is switched from a positive voltage to a negative voltage at time "c", and is switched from a negative voltage to a positive voltage at time "h". That is, as the output voltage Vout, a positive voltage is output from time "a" to time "c", a negative voltage is output from time "c" to time "h", and a positive voltage is output from time "h" to time "l".

Here, the oscillator OSC constantly outputs the triangular wave S0 regardless of the polarity of the output voltage Vout. That is, in FIG. 4, the triangular wave S0 is output, with the period from time "a" to time "b" being one period, by repeating the waveform in this period.

The triangular wave S0 is oscillated by the oscillator OSC with an amplitude between, for example, 0 V and 3 V. It is assumed that the wave height value of the triangular wave S0 is 3 V.

Hereinafter, the operation of the transfer bias power supply 27 will be described in accordance with the timing chart in FIG. 4 with reference to FIG. 3.

Here, it is assumed that "H" is 5V and "L" is 0 V, for example.

The polarity of the output voltage Vout is controlled by the polarity switching signal S20 supplied from the controller 40. As described above, the output voltage Vout is a non-transfer bias of a positive voltage (for example, 1 kV) when the polarity switching signal S20 is "L", and is a transfer bias of a negative voltage (for example, −5 kV) when the polarity switching signal S20 is "H".

First, description will be given of a case where the polarity switching signal S20 is "L" and the output voltage Vout is a positive voltage in the period from time "a" to time "c". In this case, the npn transistor Tr3 of the switching circuit 240 is in an off-state, the npn transistor Tr4 of the switching circuit 240 is in an on-state, and the output signal S21 of the error amplifier Amp3 of the switching circuit 240 is 5 V.

In the period from time "a" to time "c", the output voltage Vout is a positive voltage, and thus the remote signal S10 is "L". Thus, the setting signal S11 of the analog conversion circuit 201 is 0 V, and the output signal S12 of the error amplifier Amp1 is 0 V.

Then, the output signal S21 of the switching circuit 240, which has a higher voltage among the output signal S12 (0 V) of the error amplifier Amp1 and the output signal S21 (5 V) of the switching circuit 240, is input to the negative input terminal of the comparator Cmp1. 5 V is higher than the wave height value of the triangular wave (3 V) generated by the oscillator OSC. Thus, the output signal S13 of the comparator Cmp1 is "L".

In the period from time "a" to time "c", the remote signal S10 is "L". At this time, the output signal S30 of the output on/off determining circuit 220 is 0 V. Thus, the output signal S31 of the DTC circuit 230 is 5 V. 5 V is higher than the wave height value of the triangular wave (3 V), and thus the output signal S32 of the comparator Cmp2 is "L".

Since both of the output signal S13 of the comparator Cmp1 and the output signal S32 of the comparator Cmp2 is "L", the output signal S14 of the AND-circuit AND is "L" (0 V). Thus, the npn transistor Tr1 is in an off-state. That is, in the period from time "a" to time "c", the negative voltage generating unit 200 does not generate a negative voltage.

On the other hand, the positive voltage generating unit 210 is generating a positive voltage, and thus the output voltage Vout is a positive voltage.

At time "c", the controller 40 shifts the polarity switching signal S20 from "L" to "H". In parallel with this, the controller 40 generates a PWM signal as the remote signal S10 and outputs the PWM signal.

When the polarity switching signal S20 shifts from "L" to "H", the npn transistor Tr3 is turned on and the npn transistor Tr4 is turned off in the switching circuit 240, so that the output signal S21 of the error amplifier Amp3 becomes 0 V, as described above.

Upon receiving the PWM signal as the remote signal S10, the analog conversion circuit 201 generates the setting signal S11 of a DC voltage corresponding to the duty ratio of the PWM signal of the remote signal S10.

In FIG. 4, the remote signal S10 has a duty ratio of 50% in the period from time "c" to time "g", and a duty ratio of 35% in the period from time "g" to time "h". Time "h" is a time at which the polarity switching signal S20 shifts from "H" to "L" in order to switch the output voltage Vout from a negative voltage to a positive voltage.

Thus, as shown in the part of the remote signal S10 in FIG. 4, the output signal S12 (S11) has a higher voltage (1.4 times) in the period from time "c" to time "g" than in the period from time "g" to time "h".

The remote signal S10 is kept in the state of a PWM signal till time "j" from time "h" at which the polarity switching signal S20 shifts from "H" to "L". This is the case where the controller 40 stops transmitting the PWM signal of the remote signal S10 at time "j" after time "h" at which the polarity switching signal S20 shifts from "H" to "L". This will be described below.

In the period from time "c" to time "g", it is assumed that the setting signal S11 of the analog conversion circuit 201 is 1.5 V, which is 50% of the wave height value (3 V) of the triangular wave S0, in accordance with the duty ratio of the PWM signal of the remote signal S10. Also, it is assumed that the output signal S12 of the error amplifier Amp1 is 1.5 V.

The output signal S21 of the switching circuit 240 shifts from 5 V to 0 V in the period from time "c", at which the polarity switching signal S20 shifts from "L" to "H", to time "d". The output signal S21 is kept at 0 V till time "h".

Accordingly, in the period from time "c" to time "g", 1.5 V, which is higher among the output signal S12 of the error amplifier Amp1 and the output signal S21 of the switching circuit 240, is input to the negative input terminal of the comparator Cmp1.

Then, in the period from time "c" to time "g", the comparator Cmp1 compares the voltage of the triangular wave S0 input to the positive input terminal with the output signal S12 of the error amplifier Amp1 input to the negative input terminal, and outputs a PWM signal of "H" when the voltage of the triangular wave S0 is higher than the output signal S12, and outputs a PWM signal of "L" when the voltage of the triangular wave S0 is lower than the output signal S12.

In the period from time "g" to time "h", it is assumed that the setting signal S11 of the analog conversion circuit 201 is 1 V, which is 35% of the wave height value (3 V) of the triangular wave S0, in accordance with the duty ratio of the remote signal S10. Also, it is assumed that the output signal S12 of the error amplifier Amp1 is 1 V. Then, the output signal S13 of the comparator Cmp1 becomes a PWM signal whose duty ratio is higher than that of the output signal S13 in the period from time "c" to time "g".

At time "c", when the remote signal S10 becomes a PWM signal, the output on/off determining circuit 220 shifts the output signal S30 from "L" to "H". Then, the output signal S31 of the DTC circuit 230 decreases from 5 V at time "c" toward 0 V. In FIG. 4, the output signal S31 decreases in four periods of the triangular wave S0 (in the period from time "c" to time "f"). The capacitor C2, the resistors R3 and R4, and so forth may be set so that the output signal S31 decreases in a predetermined period.

As may be understood from the part of the input signal of the comparator Cmp2 in FIG. 4, where the triangular wave S0 of the oscillator OSC and the output signal S31 of the DTC circuit 230 are shown in a superimposed manner, the output signal S32 of the comparator Cmp2 becomes "H" when the voltage of the triangular wave S0 is higher than the voltage of the output signal S31 of the DTC circuit 230, and becomes "L" when the voltage of the triangular wave S0 is lower than the voltage of the output signal S31 of the DTC circuit 230 in the period from time "c" to time "f".

In the period from time "f" to time "g", the output signal S31 of the DTC circuit 230 is 0 V, and thus the output signal S32 of the comparator Cmp2 is "H".

That is, the output signal S32 of the comparator Cmp2 is a PWM signal whose duty ratio gradually increases in the period from time "c" to time "f" over which the voltage of the output signal S31 of the DTC circuit 230 shifts from 5 V to 0 V.

The output signal S14 of the AND-circuit AND is the AND of the output signal S13 of the comparator Cmp1 and the output signal S32 of the comparator Cmp2. In the example illustrated in FIG. 4, in the period from time "c" to time "e", the duty ratio of the output signal S32 of the comparator Cmp2 is lower than the duty ratio of the output signal S13 of the comparator Cmp1. Thus, the output signal S14 of the AND-circuit AND in the period from time "c" to time "e" is the output signal S32 of the comparator Cmp2. On the other hand, in the period from time "e" to time "f", the duty ratio of the output signal S32 of the comparator Cmp2 is higher than the duty ratio of the output signal S13 of the comparator Cmp1. Thus, the output signal S14 of the AND-circuit AND in the period from time "e" to time "f" is the output signal S13 of the comparator Cmp1.

Then, in the period from time "f" to time "h", the output signal S14 of the AND-circuit AND is the output signal S13 of the comparator Cmp1.

That is, in the period from time "c" to time "h", the output signal S14 of the AND-circuit AND is a PWM signal.

The output signal S14 of the AND-circuit AND causes the npn transistor Tr1 to be switched (on/off). Furthermore, switching (on/off) of the field-effect transistor FET1 of the driving circuit 203 generates a negative voltage in the rectifier circuit 205, and the generated negative voltage serves as the output voltage Vout.

Therefore, in the period from time "c" to time "f", the output voltage Vout is controlled so as to be gradually changed from a positive voltage to a negative voltage. That is, dead-time control is performed.

In the period from time "f" to time "g", the output voltage Vout is set by the remote signal S10 whose duty ratio is 50%. In the period from time "g" to time "h", the output voltage Vout is set by the remote signal S10 whose duty ratio is 35%.

The duty ratio of the remote signal S10 is opposite to the duty ratio of the output signal S14 of the AND-circuit AND. Thus, the output voltage Vout in the period from time "f" to time "g" over which the duty ratio of the remote signal S10 is high is a negative voltage whose absolute value is smaller than that of the output voltage Vout in the period from time "g" to time "h" over which the duty ratio of the remote signal S10 is low.

At time "h", the polarity switching signal S20 is switched from "H" to "L".

Then, the output signal S21 of the switching circuit 240 changes from 0 V to 5 V from time "h" to time "i".

On the other hand, it is assumed that, after the polarity switching signal S20 changes from "H" to "L" at time "h", a PWM signal is not stopped in the remote signal S10 and the PWM signal is transmitted till time "j". Also, it is assumed that the remote signal S10 becomes "L" at time "j".

Then, the output signal S12 of the error amplifier Amp1 is kept at 1 V in the period from time "h" to time "j".

Here, a signal of a higher voltage among the output signal S12 of the error amplifier Amp1 and the output signal S12 of the switching circuit 240 is set to the negative input terminal of the comparator Cmp1. Thus, the voltage at the negative input terminal of the comparator Cmp1 increases from 1 V to 5 V in the period from time "h" to time "i", and is kept at 5 V till time "l". 5 V is higher than the wave height value (3 V) of the triangular wave S0, and thus the output signal S13 of the comparator Cmp1 is "L" in the period from time "h" to time "l".

On the other hand, the output signal S30 of the output on/off determining circuit 220 shifts from "H" to "L" at time "j" at which the remote signal S10 is changed from a PWM signal to "L". Accordingly, the output signal S31 of the DTC circuit 230 increases from 0 V to 5 V in the period from time "j" to time "k" illustrated in FIG. 4.

Then, the output signal 32 of the comparator Cmp2 becomes a PWM signal whose duty ratio gradually decreases in the period from time "j" to time "k".

In the period from time "j" to time "k", the npn transistor Tr2 of the DTC circuit 230 shifts from on to off, and the capacitor C2 is charged via the resistors R2 and R3. Therefore, the period over which the output signal S31 of the DTC circuit 230 changes from 0 V to 5V (the period from time "j" to time "k" in FIG. 4) is determined in accordance with the capacitance of the capacitor C2 and the resistance of the resistors R2 and R3.

However, since the output signal S14 of the AND-circuit AND is the AND of the output signal S13 of the comparator Cmp1 and the output signal S32 of the comparator Cmp2, the output signal S14 is the output signal S13 of the comparator Cmp1, which is "L", from time "h".

That is, in the present exemplary embodiment, a negative voltage continues to be output but is suppressed, even if the remote signal S10 does not become "L" and a PWM signal is continuously output after time "h" at which the polarity switching signal S20 shifts from "H" to "L".

Here, in order to perform dead-time control, a time constant for the output signal S31 of the DTC circuit 230 (time constant determined in accordance with the capacitor C2 in FIG. 3) is set to be larger than a time constant for the output signal S21 of the switching circuit 240.

Accordingly, in a case where the output voltage Vout is switched from a positive voltage to a negative voltage, dead-time control is performed, and the switching time for switching from a negative voltage to a positive voltage is shortened (suppressed).

Figure 5:
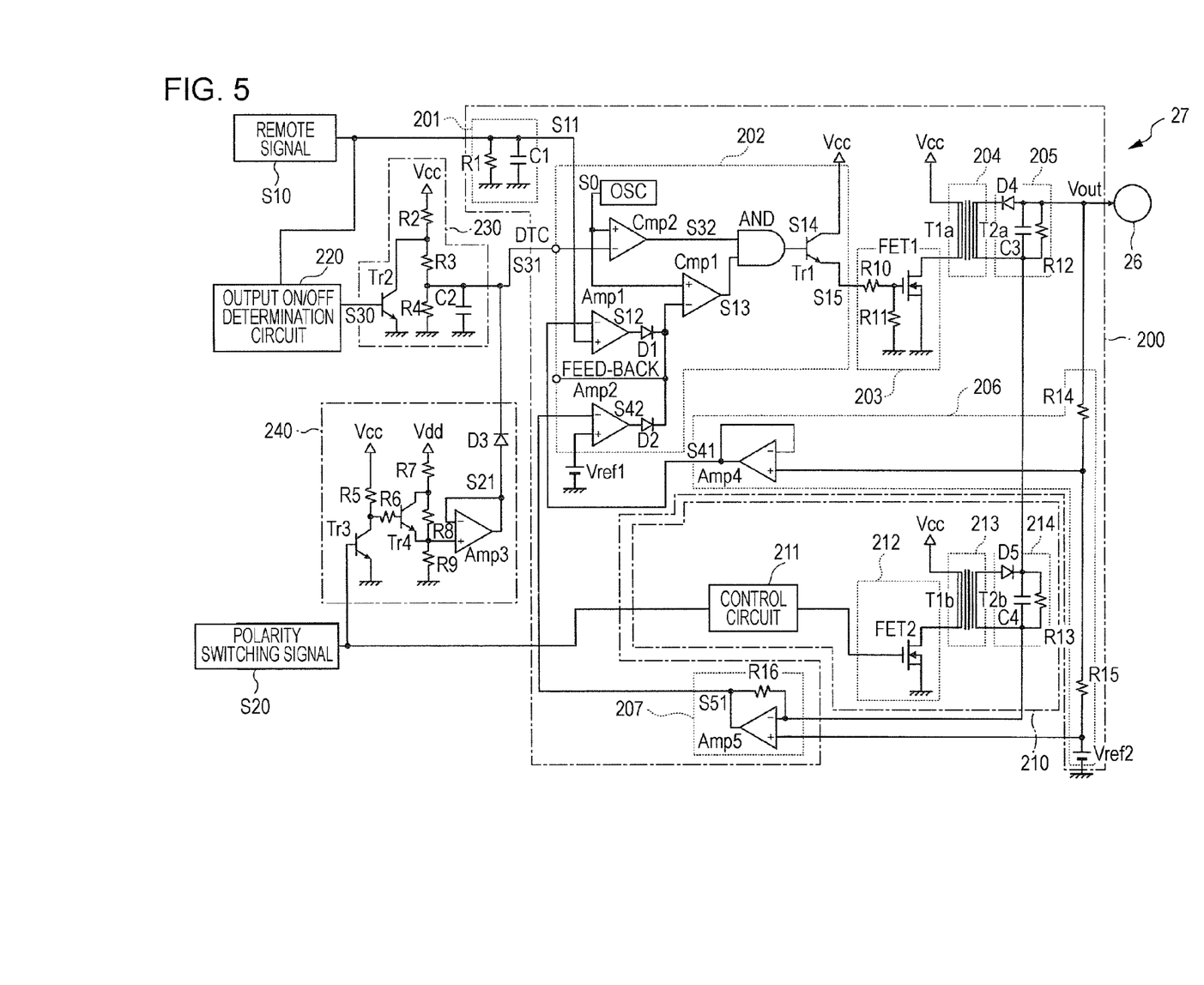
FIG. 5 is a diagram illustrating an example of circuit blocks and a circuit configuration of a transfer bias power supply to which the exemplary embodiment is not applied.

Now, the transfer bias power supply 27 to which the present exemplary embodiment is not applied will be described.

FIG. 5 is a diagram describing circuit blocks and a circuit configuration of the transfer bias power supply 27 to which the present exemplary embodiment is not applied.

In the present exemplary embodiment, as illustrated in FIG. 3, the output signal S21 of the switching circuit 240 is supplied to the negative input terminal of the comparator Cmp1 via the feed-back terminal. In contrast, in the transfer bias power supply 27 to which the present exemplary embodiment is not applied, the output signal S21 of the switching circuit 240 is supplied to the negative input terminal of the comparator Cmp2 via the DTC terminal, as illustrated in FIG. 5. That is, the negative input terminal of the comparator Cmp2 receives the output signal S31 of the DTC circuit 230 and the output signal S21 of the switching circuit 240 (in FIG. 6, "S31 OR S21").

Thus, the output signal S31 is affected by the output signal S21 of the switching circuit 240. However, the capacitance (the capacitor C2 in FIG. 5) with respect to the output signal S31 is large, and thus the output signal S31 is less likely to be affected by the output signal S21.

In FIG. 5, the output terminal of the DTC circuit 230 (one terminal of the capacitor C2) is connected to the negative input terminal of the comparator Cmp2 without via a diode. Alternatively, a diode may be provided to suppress an influence of the output signal S21 of the switching circuit 240.

The configuration of the other parts is the same as that of the present exemplary embodiment illustrated in FIG. 3, and thus the description thereof is omitted.

Figure 6:
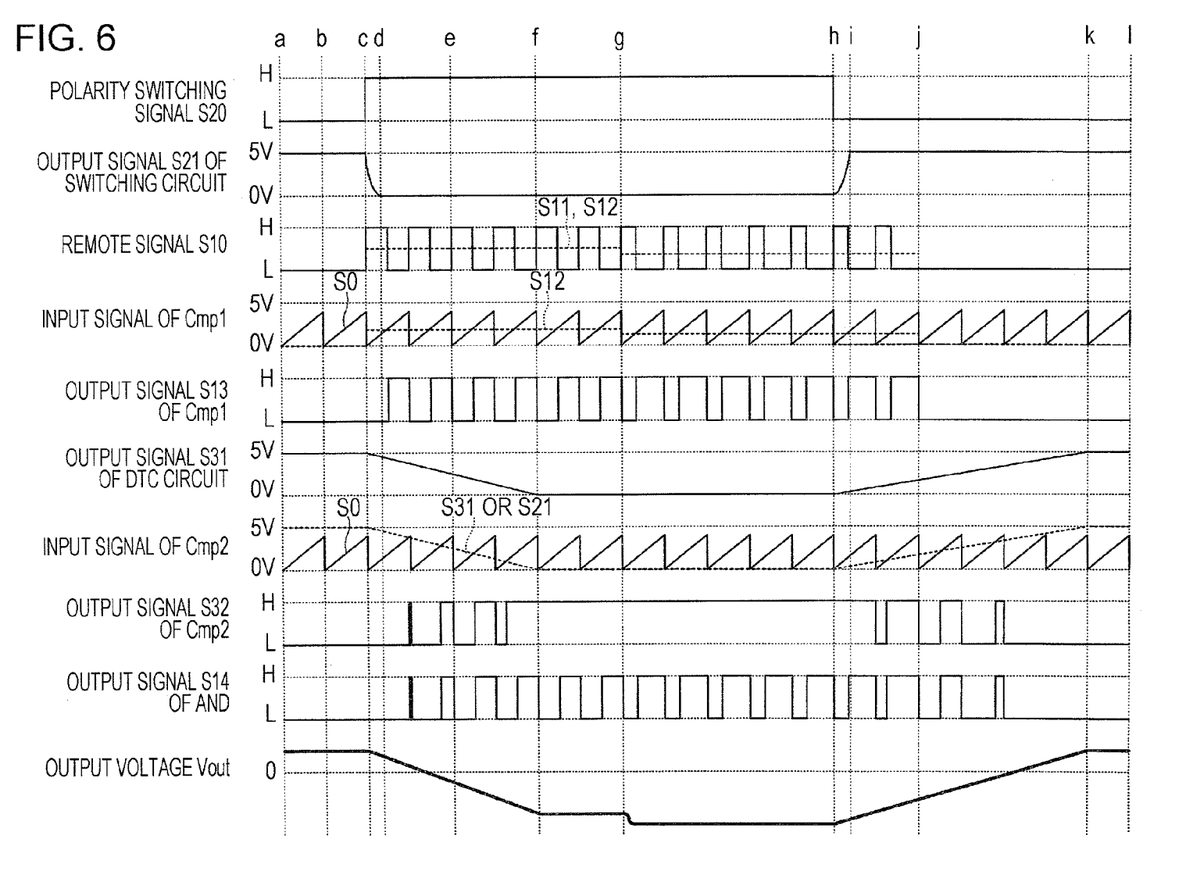
FIG. 6 is a timing chart describing an operation of the transfer bias power supply to which the exemplary embodiment is not applied.

FIG. 6 is a timing chart describing the operation of the transfer bias power supply 27 to which the present exemplary embodiment is not applied. The signals illustrated in FIG. 6 are the same as those illustrated in FIG. 4. Also, times "a", "b", "c", . . . are the same as those in FIG. 4.

Hereinafter, the parts different from FIG. 4 will be described, and the description of the same parts as in FIG. 4 is omitted.

In a case where the present exemplary embodiment is not applied, as illustrated in FIG. 5, the output signal S12 of the error amplifier Amp1 is input to the negative input terminal of the comparator Cmp1 (see "input signal of Cmp1" in FIG. 6).

Also, the output signal S31 of the DTC circuit 230 and the output signal S21 of the switching circuit 240 are input to the negative input terminal of the comparator Cmp2. However, since the capacitance of the capacitor C2 is large, the output signal S31 is less likely to be affected by the output signal S21 (see "input signal of Cmp2" in FIG. 6).

Accordingly, the states of the signals in the period from time "a" to time "h" are similar to those in the present exemplary embodiment, and thus the description thereof is omitted. Hereinafter, description will be given of time "h" and thereafter.

In the period from time "h" to time "j", the remote signal S10 is kept in a PWM signal state. Thus, the output signal S13 of the comparator Cmp1 is a PWM signal corresponding to the remote signal S10 from time "c" to time "j".

The output signal S31 of the DTC circuit 230 and the output signal S21 of the switching circuit 240 are input to the negative input terminal of the comparator Cmp2. As described above, the capacitance (capacitor C2) with respect to the output signal S31 of the DTC circuit 230 is large. Thus, even if the output signal S21 shifts from 0 V to 5 V in the period from time "h" to time "i", it becomes necessary to charge the capacitor C2 of a large capacitance, and it takes time to change the voltage at the negative input terminal of the comparator Cmp2 from 0 V to 5 V. In FIG. 6, it takes the time period from time "h" to time "k" to change the voltage at the negative input terminal of the comparator Cmp2 from 0 V to 5 V (see "S31 OR S21" in input signal of Cmp2 in FIG. 6).

Therefore, the output signal S32 of the comparator Cmp2 is a PWM signal whose duty ratio gradually decreases in the period from time "h" to time "k".

Then, the output signal S14 of the AND-circuit AND, which is the AND of the output signal S32 of the comparator Cmp2 and the output signal S13 of the comparator Cmp1, generates a PWM signal in the period from time "h" to time "k".

Accordingly, even after time "h" at which the polarity switching signal S20 shifts from "H" to "L", the negative voltage generating unit 200 continues to generate a negative voltage, and it takes time to switch the voltage to the positive voltage generated by the positive voltage generating unit 210.

As is understandable from comparison between FIGS. 4 and 6, the polarity of the output voltage Vout is switched from negative to positive in the period from time "h" to time "i" in FIG. 4, which illustrates the present exemplary embodiment, whereas the switching is performed in the period from time "h" to time "k" in FIG. 6, which illustrates the case where the present exemplary embodiment is not applied.

That is, in a case where the present exemplary embodiment is not applied, the output signal S21 of the switching circuit 240 is supplied to the negative input terminal of the comparator Cmp2 for which a large capacitance (the capacitor C2 in FIGS. 3 and 5) is provided to perform dead-time control. Thus, it takes time to stop the operation of the control circuit 202 and to stop the output of a negative voltage.

As described above, the negative voltage is −5 kV and the positive voltage is 1 kV, for example. Since the absolute value of the negative voltage is larger than that of the positive voltage. Thus, if the negative voltage is continuously output, the negative voltage is not cancelled even if the positive voltage is output. Accordingly, adhesion of toner onto the second transfer roller 22 is not suppressed, and toner adheres to the second transfer roller 22. This may cause transfer failure of a toner image or stain of the sheet P due to the toner adhered to the second transfer roller 22.

On the other hand, in the present exemplary embodiment, the output signal S21 of the switching circuit 240 is supplied to the feed-back terminal (the negative input terminal of the comparator Cmp1) whose capacitance is smaller than that of the DTC terminal, not to the DTC terminal (the negative input terminal of the comparator Cmp2). Accordingly, compared to a case where the present exemplary embodiment is not applied, the time to stop the operation of the control circuit 202 and to stop output of the negative voltage is shortened.

As described above, in the present exemplary embodiment, in a case where the output voltage Vout is switched from a positive voltage whose absolute value is small (for example, 1 kV) to a negative voltage whose absolute value is large (for example, −5 kV), dead-time control is performed to prevent a sudden application of a negative voltage whose absolute value is large, a signal is supplied via a terminal (DTC terminal) with a large capacitance (time constant: an example of a first time constant) to start the operation of the control circuit 202 of the negative voltage generating unit 200, and control is performed so that the negative voltage gradually increases.

On the other hand, in a case where the output voltage Vout is switched from a negative voltage whose absolute value is large (for example, −5 kV) to a positive voltage whose absolute value is small (for example, 1 kV), a signal is supplied via a terminal (feed-back terminal) with a small capacitance (time constant: an example of a second time constant) to stop the operation of the control circuit 202 of the negative voltage generating unit 200. Accordingly, the time period until when output of the negative voltage from the negative voltage generating unit 200 stops is shortened (suppressed).

Accordingly, even if the PWM signal of the remote signal S10 for setting a negative voltage continues to be output after the time (time "h" in FIG. 4) at which the polarity switching signal S20 shifts from "H" to "L", the operation of the control circuit 202 may be stopped without being affected by the PWM signal of the remote signal S10.

According to the description given above, the PWM signal of the remote signal S10 continues to be output even after the time (time "h" in FIG. 4) at which the polarity switching signal S20 shifts from "H" to "L".

However, there is a possibility that the setting signal S11 does not immediately become 0 V due to residual charge, even if the remote signal S10 becomes "L" at the time (time "h" in FIG. 4) at which the polarity switching signal S20 shifts from "H" to "L". In such a case, the output signal S13 of the comparator Cmp1 continues to be output as a PWM signal even after the time (time "h" in FIG. 4) at which the polarity switching signal S20 shifts from "H" to "L". This is the same as the case where the PWM signal of the remote signal S10 continues to be output even after the time (time "h" in FIG. 4) at which the polarity switching signal S20 shifts from "H" to "L".

In the present exemplary embodiment, the positive voltage generating unit 210 is a self-excited switching power supply. Alternatively, the positive voltage generating unit 210 may be a separately excited switching power supply, like the negative voltage generating unit 200, and may be controlled by a control circuit similar to the control circuit 202.

In this case, the time for switching from a positive voltage to a negative voltage may be suppressed by suppressing the time to stop the operation of the control circuit of the positive voltage generating unit 210 at the timing of switching the output voltage Vout from a positive voltage to a negative voltage.

The negative voltage is −5 kV and the positive voltage is 1 kV, for example, and the absolute value of the negative voltage is larger than that of the positive voltage. Thus, the positive voltage may be cancelled at the switching from the positive voltage to the negative voltage. Therefore, such control is not performed at the timing of switching the output voltage Vout from the positive voltage to the negative voltage.

In the present exemplary embodiment, the transfer bias power supply 27 has been described as a power supply that generates a transfer bias in the second transfer section 20. The transfer bias power supply 27 may be applied to a power supply that generates a first transfer bias in the first transfer sections 10.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:
an image carrier;
a charging unit that charges the image carrier;
an exposure unit that exposes the image carrier to light and that forms an electrostatic latent image on the image carrier;
a developing unit that develops the electrostatic latent image formed on the image carrier exposed by the exposure unit, so as to form a developed image; and
a transfer unit that includes a transfer bias power supply and that transfers the developed image onto a transfer body, the transfer bias power supply including a first power supply unit, a second power supply unit, a first switching controller, and a second switching controller, the first power supply unit generating a non-transfer electric field for not transferring the developed image onto the transfer body, the second power supply unit generating a transfer electric field for transferring the developed image onto the transfer body, the transfer electric field having a polarity different from a polarity of the non-transfer electric field, the first switching controller having a predetermined first time constant and controlling start of supply of the transfer electric field from the second power supply unit in accordance with the first time constant when switching from the non-transfer electric field to the transfer electric field is performed, and the second switching controller having a second time constant which is smaller than the first time constant and controlling stop of supply of the transfer electric field from the second power supply unit in accordance with the second time constant when switching from the transfer electric field to the non-transfer electric field is performed.

2. The image forming apparatus as claimed in claim 1, wherein the first switching controller has a larger capacitance than the second switching controller.

3. The image forming apparatus as claimed in claim 1, wherein:
the first switching controller comprises a capacitor; and
the second time constant is smaller than the first time constant in accordance with a capacitance of the capacitor.

4. The image forming apparatus as claimed in claim 1, wherein:
the first switching controller controls the start of the supply of the transfer electric field by outputting a first signal to a driving circuit of the second power supply unit; and
the second switching controller controls the stop of the supply of the transfer electric field by outputting a second signal to the driving circuit of the second power supply unit.

5. The image forming apparatus as claimed in claim 4, wherein:
the first switching controller outputs the first signal to a first comparator of the driving circuit; and
the second switching controller outputs the second signal to a second comparator of the driving circuit.

6. The image forming apparatus as claimed in claim 5, wherein:
the first switching controller outputs the first signal to a negative input terminal of the first comparator of the driving circuit; and
the second switching controller outputs the second signal to a negative input terminal of the second comparator of the driving circuit.

7. A bias power supply device comprising:
a first power supply unit that supplies a voltage of a first polarity to a load;
a second power supply unit that supplies a voltage of a second polarity to the load, the second polarity being different from the first polarity;
a first switching controller that has a predetermined first time constant and that controls start of supply of the voltage of the second polarity from the second power supply unit in accordance with the first time constant when a voltage to be supplied to the load is switched from the voltage of the first polarity to the voltage of the second polarity; and
a second switching controller that has a second time constant which is smaller than the first time constant and that controls stop of supply of the voltage of the second polarity from the second power supply unit in accordance with the second time constant when a voltage to be supplied to the load is switched from the voltage of the second polarity to the voltage of the first polarity.

8. The bias power supply device according to claim 7, wherein the voltage of the first polarity has an absolute value which is smaller than an absolute value of the voltage of the second polarity.

9. The bias power supply device according to claim 7, wherein the second power supply unit includes a switch element that is switched using a pulse-width-modulated signal, and
wherein the second switching controller stops the pulse-width-modulated signal to stop supply of the voltage of the second polarity from the second power supply unit when a voltage to be supplied to the load is switched from the voltage of the second polarity to the voltage of the first polarity.

10. The bias power supply device according to claim 8, wherein the second power supply unit includes a switch element that is switched using a pulse-width-modulated signal, and
wherein the second switching controller stops the pulse-width-modulated signal to stop supply of the voltage of the second polarity from the second power supply unit when a voltage to be supplied to the load is switched from the voltage of the second polarity to the voltage of the first polarity.

11. A bias power supply method comprising:

supplying a voltage of a first polarity to a load;

supplying a voltage of a second polarity to the load, the second polarity being different from the first polarity;

controlling start of supply of the voltage of the second polarity in accordance with a first time constant when a voltage to be supplied to the load is switched from the voltage of the first polarity to the voltage of the second polarity; and controlling stop of supply of the voltage of the second polarity in accordance with a second time constant which is smaller than the first time constant when a voltage to be supplied to the load is switched from the voltage of the second polarity to the voltage of the first polarity.

* * * * *